United States Patent [19]
Sakakibara

[11] 3,820,624
[45] June 28, 1974

[54] ELECTRONIC SPEED CONTROL SYSTEM FOR VEHICLES

[75] Inventor: Naoji Sakakibara, Kiraya, Japan

[73] Assignee: Aisin Seiki Kabushiki Kaisha, Aichi-ken, Japan

[22] Filed: Apr. 14, 1972

[21] Appl. No.: 244,087

[30] Foreign Application Priority Data
Apr. 20, 1971   Japan.............................. 46-25446

[52] U.S. Cl. ............................ 180/105 E, 123/102
[51] Int. Cl.............................................. B60k 31/00
[58] Field of Search .......... 180/105; 123/102; 317/5

[56] References Cited
UNITED STATES PATENTS

| | | | |
|---|---|---|---|
| 3,346,771 | 10/1967 | Sutton.............................. | 123/102 |
| 3,560,854 | 2/1971 | Moss................................ | 123/102 |
| 3,570,622 | 3/1971 | Wisner............................. | 180/105 |
| 3,630,304 | 12/1971 | Sahinkaya..................... | 180/105 E |
| 3,659,571 | 5/1972 | Lang................................. | 123/102 |
| R27,324 | 3/1972 | Granger........................... | 180/105 |

*Primary Examiner*—Leo Friaglia
*Assistant Examiner*—Terrance L. Siemens
*Attorney, Agent, or Firm*—Berman, Bishoff & Platt

[57] ABSTRACT

A control system for automatically maintaining a desired rate of travel of a vehicle by way of comparing an actual speed signal generated in response to a travelling speed of the vehicle with a standard signal generated to represent the desired travel rate of the vehicle. The system further comprises a synchronous pulse generator to generate with a slight delay a synchronous pulse corresponding to the actual speed signal, and a speed acceleration-deceleration compensating circuit for compensating temporarily the standard signal in response to a width difference between a pulse converted from the actual speed signal and the synchronous pulse, thereby to essentially eliminate hunting, overshoot and undershoot of the vehicle under any cruising conditions.

10 Claims, 6 Drawing Figures

① PULSE SIGNAL FROM FIRST FLIP-FLOP CIRCUIT
② PULSE SIGNAL FROM FIRST MONOSTABLE MULTIVIBRATOR
③ SPEED-DIFFERENTIAL-PULSES 3,820,624

ELECTRONIC SPEED CONTROL SYSTEM FOR VEHICLES

BACKGROUND OF THE INVENTION

This invention relates to a speed control system for a vehicle, and more particularly to an electronic control system for maintaining a given rate of travel of the vehicle.

In reply to demands for automatic speed control for a vehicle to realize a comfortable drive of long duration with less fatigue of the driver and good gas mileage, several types of automatic control devices have been introduced. Among these devices, an electronic system has naturally proved to be most accurate in operation and compact in size.

In automatic speed control, there have been raised problems of hunting, overshooting and undershooting. Among the known systems, a potentiometer has been applied to feed the degree to which a throttle valve is open back to the control system in a hope to eliminate the hunting.

The installation of the potentiometer is, however, a complicated and time consuming. Furthermore, when one type of potentiometer is utilized for different models of vehicles, careful and troublesome adjustment is required, otherwise, a number of different types should be prepared in correspondence with the number of different models of vehicles. Another problem with application of the potentiometer exists that the open degree of the throttle valve at a speed varies with each individual vehicle of a model, which would disable accurate control or require fine adjustment differently for each vehicle.

In cruising at a constant rate of speed in a vehicle regulated by one of the prior art systems, the driver feels irritation since the vehicle speed decreases, for example, on a slope where the speed goes down in regular drive. This is caused by opening the throttle valve over to a greater degree than required on a flat or horizontal road, to maintain a given rate of speed of the vehicle, to which the valve is open being fed back to the system which, then, works to close the throttle valve. The rsult is that the vehicle runs at a speed below the preset one with hunting of the engine.

SUMMARY OF THE INVENTION

A prime object of the present invention is, therefore, to provide an electronic speed control system for a vehicle, which maintains a predetermined rate of travel of the vehicle without hunting, overshoot and undershoot under any cruising conditions.

Another object of the present invention is to provide an electronic speed control system for a vehicle, having the above-mentioned characteristics, wherein the system can easily be installed on any type of vehicle with no special adjustment nor reconstruction.

It is still another object of the present invention is to provide an electronic speed control system for a vehicle, having the above-mentioned characteristics, wherein temporary compensating operation is provided to compensate control-displacements caused by acceleration or deceleration which is produced in the course of regular speed control operation.

It is further an object of the present invention is to provide an electronic speed control system for a vehicle, having the above-mentioned characteristics, wherein the temporary compensating operation is blocked out in travel rate changing process, so as to enable an accurate speed rate setting.

It is still a further object of the present invention to provide an electronic speed control system for a vehicle, having the above-mentioned characteristics, wherein there is no unecessary acceleration or deceleration in operation to control a speed toward the predetermined one so as to eliminate irritation of the driver and improve gas mileage.

The speed control system constructed in accordance with the present invention, therefore, comprises an actuator to automatically control the throttle valve; a speed detecting generator to generate a signal representing a vehicle speed; a standard signal generator for generating a standard signal corresponding to a predetermined speed of the vehicle; a comparison circuit for operating the actuator upon detecting differences between the signals from the mentioned two generators; a memory circuit operated by the comparison circuit and for registering a signal responsive to the predetermined rate of travel of the vehicle into the standard signal generator as the standard signal; manual control means for regulating the memory circuit; a synchronous pulse generator to generate with a slight delay a synchronous pulse corresponding to the signal from the speed detecting generator; and a speed acceleration-deceleration compensating circuit for compensating temporarily the standard signal, the compensating facility being disabled while the memory circuit is in its operative condition.

BRIEF DESCRIPTION OF THE DRAWINGS

The above and other objects, features and advantages of the present invention will become more readily apparent from the following description of the preferred embodiment with reference to the accompanying drawings forming a part of the specification. In the drawings.

DESCRIPTION OF THE PREFERRED EMBODIMENT

Figure 1:
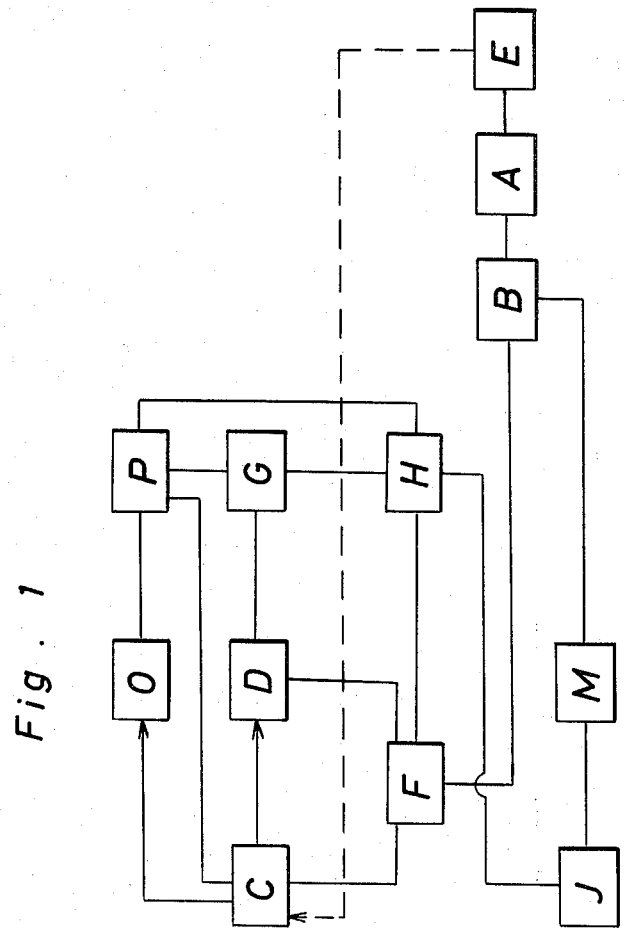
FIG. 1 shows a block schematic diagram of an embodiment in accordance with the present invention.

Reference is made to the drawings and particularly to FIG. 1 which shows a general arrangement of constructive parts of the present invention by way of a schematic block diagram. Capital letters used in blocks represent respectively the working parts as explained below;

E — A prime engine of a vehicle.

A — A throttle valve to control engine rotation in response to depressing actuation given to an accelerator pedal (not shown in FIG. 1).

B — Control means for regulating operation of the throttle valve A independently of operation of the accelerator pedal.

C — A speed-detecting-pulse generator to generate pulses having pulse-widths representative of vehicle speed.

D — A reference-pulse generator to issue a reference pulse responsive to a predetermined vehicle speed.

F — A comparison circuit which generates an output for operating the control means B when a difference is detected between the reference-pulse width and a speed-detecting-pulse width in the comparing process conducted by the comparison circuit F.

G — A memory circuit operated by the output from the comparison circuit F which registers a pulse responsive to a vehicle speed in the reference pulse generator D as a reference-pulse.

J — A manual control-switch of a suitably selected conventional type.

H — Memory control means for regulating operation of the memory circuit G in accordance with operation of the manual control-switch J.

M — A control circuit to raise and maintain operative condition of the control means B while the manual control-switch J is inoperative and to disable the control means B when the vehicle speed is decreased by operation of a brake system and/or clutch means of the vehicle.

O — A synchronous-pulse generator to issue a synchronous pulse in correspondence with the pulse responsive to a vehicle speed by way of chasing the pulse from the speed-detecting-pulse generator C.

P — A speed acceleration-deceleration compensating circuit to discharge its output when a difference is detected between widths of the synchronous pulse and the pulse responsive to a vehicle speed in its pulse comparing process. By means of the output discharged therefrom, this circuit P adjusts temporarily the reference-pulse from the reference-pulse generator D and disables this adjusting operation while the memory circuit G is in its operative condition.

Figure 2:
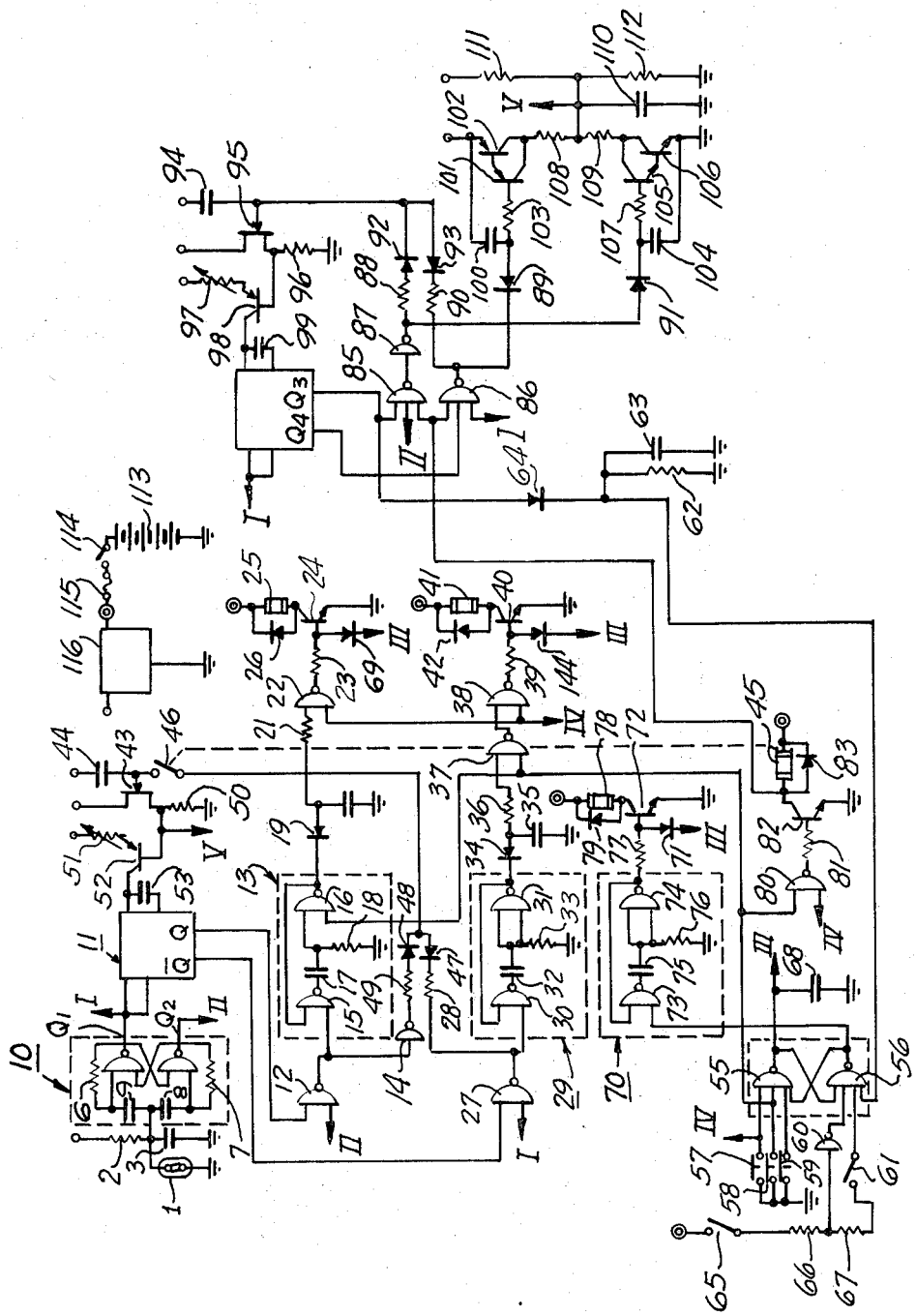
FIG. 2 illustrates a schematic wiring diagram of FIG. 1.

Described in detail hereinafter are embodiments of the above-listed circuits and means. FIG. 2 is particularly referred to in disclosing the embodiments.

The speed detecting pulse generator C comprises a speed senser 1 of a reed switch type for generating a pulse responsive to a vehicle speed, the senser 1 being engagedly mounted on a rotating portion of the vehicle such as an output shaft of the prime engine E. A resistor 2 is connected to the senser 1 in series, while a condenser 3 is in parallel. Output of this particular circuit C is delivered into a flip-flop circuit 10 through an input terminal thereof, the flip-flop circuit 10 comprising NAND elements 4 and 5, resistors 6 and 7, and condensers 8 and 9.

The reference-pulse generator D comprises a first monostable multivibrator 11 including a transistor 52, a condenser 53 and a variable resistor 51 which form a time constant circuit for the first monostable multivibrator 11. A trigger terminal of the first monostable multivibrator 11 is connected to an output terminal $Q_1$ of the flip-flop circuit 10.

The comparison circuit F comprises a NAND element 12 of which input terminals are connected to both output terminal $Q_2$ of the flip-flop circuit 10 and a terminal Q of the first monostable multivibrator 11; a second monostable multivibrator 13 connected to one end of the NAND element 12; a NAND element 22 connected to an output terminal of the second monostable multivibrator 13 through a diode 19 and an integration circuit including a resistor 21 and condenser 20; a NAND element 27 having its input terminal connected to both of the output terminal $Q_1$ of the flip-flop circuit 10 and the terminal $\overline{Q}$ of the first monostable multivibrator 11; a third monostable multivibrator 29 in connection with an output terminal of the NAND element 27; and a NAND element 37 which is connected to an output terminal of the third monostable multivibrator 29 through a doiode 34 and an integration circuit comprising a condenser 35 and a resistor 36.

Connection is made between another output terminal of the NAND element 12 and one end of open-type contacts 46 through a digital-to-analogue convertor comprising an inverter 14, a resistor 49 and a diode 48. Another output terminal of the NAND element 27 is connected to one end of the open-type contacts 46 through a resistor 28 and a diode 47. The second monostable multivibrator 13 and the third monostable multivibrator 29 respectively consist mainly of well known two-NAND elements, the former 13 comprising NAND elements 15 and 16, a condenser 17 and a resistor 18, and the latter 29 comprising NAND elements 30 and 31, a condenser 32, and a resistor 33.

The control means B for regulating operation of the throttle valve A comprises a transistor 24, a base and thereof being connected to an output terminal of the NAND element 22 of the comparison circuit F through a resistor 23 while a collector end thereof being connected to a closed-type solenoid valve 25 (refer to FIG. 3); a transistor 40 of which a base end is connected to an output terminal of the NAND element 37 of the comparison circuit F through a NAND element 38 and a resistor 39, an open-type solenoid valve 41 (refer to FIG. 3) being connected to the collector end of the transistor 40; and a transistor 72, a base end thereof being connected to an output terminal of a fourth monostable multivibrator 70 through a resistor 77, an open-type solenoid valve 78 being connected to a collector end of transistor 72. Diodes 26, 42 and 79 coupled respectively to the collector ends of the transistors 24, 40 and 72 are for surge absorption.

Figure 3:
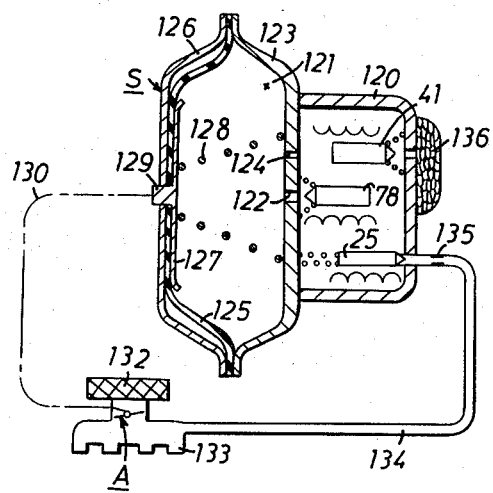
FIG. 3 shows schematically a throttle valve actuator applied to the embodiment in accordance with the present invention.

Referring now to FIG. 3, the solenoid valves 25, 41 and 78 are installed within a valve housing 120 of an actuator S controlling opening-operation of the throttle valve A by way of a vacuum force produced within an intake mainifold 133 of the engine E. The closed-type solenoid valve 25 controls vacuum force lead into the housing 120 through a conduit 134 connected to the manifold 133 and an orifice 135 provided within the conduit 134. The open-type solenoid valve 41 regulates the atmospheric air delivered inside the housing 120 through an air-cleaner 136. The open-type solenoid valve 78 conducts open-close operation against a valve hole 122 which communicates the housing 120 with a servo-chamber 121. The actuator S further comprises a servo-housing 123, a cover 126, a diaphragm 125 with its annular edge pressedly held between annular flange portions of the housing 123 and the cover 126, and a coil spring 128 interposed between a plate 127 and the housing 123 for normally biasing the diaphragm 125 toward the interior wall of the cover 126. When vacuum force is delivered into the servo-chamber 121 through the valve hole 122 and an orifice 124, the diaphragm 125 moves toward the servo-housing 123 or rightward in FIG. 3 against resilient force of the coil spring 128. This displacement of the diaphragm 125 adjusts the opening of the throttle valve A through a flexible wire-cable 130 to consequently control rotation of the prime engine E.

Referring back to FIG. 2, as in the case of the second and third monostable multivibrators 13 and 29, the fourth monostable multivibrator 70 comprises a NAND element 73, a condenser 75, a resistor 76 and a NAND element 74. An input terminal of the fourth monostable multivibrator 70 is connected to an output terminal of a flip-flop circuit 54 hereinafter described.

The memory circuit G comprises a field effect transistor 43 of MOS type (hereinafter called simply "MOS. FET") having two gates and a condenser 44 coupled to a first gate of the MOS. FET 43. Wiring is arranged for the MOS. FET 43 so that its second gate is coupled to the speed acceleration-deceleration compensating circuit P, its drain to a current source, and its source to the base of the transistor 52 and also grounded through a resistor 50.

The memory control means H comprises the open-type contacts 46 of a relay 45 interposed between the first gate of the MOS. FET 43 and the diodes 47 and 48, and a transistor 82 to drive the relay 45. The base of the transistor 82 is coupled across a resistor 81 to an output terminal of a NAND element 80 of which input terminals are coupled to both of an open-type set-up switch 57 and an open-type set-down switch 58. A diode 83 is for surge absorption.

The control circuit M is represented by the flip-flop circuit 54 comprising a pair of NAND elements 55 and 56. Each input of the NAND element 55 is respectively connected to the set-up and set-down switches 57 and 58, a resume switch 59 and an output terminal of the NAND element 56. The mentioned three 3 switches 57, 58 and 59 are grounded respectively at the other ends thereof and form the manual control switch J. Each input terminal of the NAND element 56 is respectively coupled to the output terminal of the NAND element 55, an inverter 60, an open-type clutch switch 61, cathode of a diode 64, and a resistor 62. The output terminal of the NAND element 55 is connected to the bases of the transistors 24, 40 and 72 across diodes 69, 144 and 71. The output terminal of the NAND element 56 is connected to the input terminal of the NAND element 73 of the fourth monostable multivibrator 70.

The set-up switch 57 is further coupled to the input terminals of the NAND elements 22, 38 and 80, and the set-down switch 58 is also connected further to the input terminals of the NAND elements 16, 37 and 80.

A releasing circuit for disabling the control means B is formed with an open-type stop-switch 65 operable in response to braking operation and connected to an input terminal of the inverter 60 through resistors 66 and 67, and the clutch-switch 61 connected to an input terminal of the NAND element 56. A charge-discharge circuit is formed with a diode 64 coupled to the input terminal of the NAND element 56, the resistor 62, and a condenser 63. The diode 64, the resistor 62 and the condenser 63 are connected to the synchronous-pulse generator O.

The synchronous-pulse generator O, an important part of the present invention, comprises a fifth monostable multivibrator 84 including a transistor 98, a condenser 99, and a variable resistor 97, these three parts comprising information of a time constant circuit for the fifth monostable multivibrator 84. A trigger terminal of the fifth monostable multivibrator 84 is coupled to the output $Q_1$ of the flip-flop circuit 10. Base of the transistor 98 is connected to a source of a second field effect transistor of contact type 95.

The speed acceleration-deceleration compensating circuit P, another important part of the present invention, comprises a NAND element 85 with its input terminals coupled to the output terminal $\overline{Q_2}$ of the flip-flop circuit 10, a terminal $Q_3$ of the fifth monostable multivibrator 84 and the collector terminal of the transistor 82; a NAND element 86 with its input terminals connected to the output terminal $Q_1$ of the flip-flop circuit 10, a terminal $Q_4$ of the fifth monostable multivibrator 84 and the collector terminal of the transistor 82; transistors 105 and 106 in darlington connection with the output terminal of the NAND element 85 through an inverter 87, a diode 91, a resistor 107 and a condenser 104; and transistors 101 and 102 in darlington connection with the output terminal of the NAND element 86 through a diode 89, a resistor 103 and a condenser 100. The output terminal of the NAND element 85 is further coupled to a gate of the second FET 95 through the inverter 87, a resistor 88, and a diode 92. The output terminal of the NAND element 86 is also connected further to the gate of the second FET 95 across a resistor 90 and a diode 93. Wiring is made for the second FET 95 in a manner that its drain is coupled to the current source and its source to base of the transistor 98 through a resistor 96 the other end of which is. The two pairs of the transistors 101, 102 and 105, 106 in darlington connection have the collector terminals thereof coupled to resistors 108 and 109 of which connecting points are respectively in connection with a condenser 110 having its other end grounded, the second gate of the MOS. FET 43 and the current source through a connecting point of resistors 111 and 112 which are grounded. Reference numerals 113, 114, 115 and 116 in FIG. 2 indicate respectively a battery of which cathode is grounded, a main switch, a fuse, and a constant-voltage circuit. An output terminal of the constant-voltage circuit 116 is in connection with each terminal shown respectively with a circle mark. Each double circle mark indicates the original battery voltage.

Novel operation of the present invention will be fully described hereinafter. Memory-setting operation will be explained first for convenience, since the described embodiment is so constructed that the memory-setting operation is conducted merely by operation of the manual control-switch J while the vehicle is travelling.

Pulse signals repeatedly issued from the sensor 1 of the speed-detecting-pulse generator C are flattened to a certain degree by the condenser 3 to eliminate possible influence by chattering of the reed switch. Then, the pulse signals are utilized as triggers for the flip-flop circuit 10. In this case, as referred to FIGS. 4 and 5, square waves are obtained as output of the flip-flop circuit 10. Upon generation of the output from the flip-flop circuit 10, the monostable multivibrator 11 is triggered and as well shown in FIGS. 4 and 5, wave shape thereof changes after a certain period of time regulated by a time constant determined by the variable resistor 51, the transistor 52 and the condenser 53. It should be well noted that different time-constants are applied respectively in FIGS. 4 and 5. In the present embodiment, the memory-setting of the vehicle speed is conducted by way of having the width of the output pulse from the flip-flop circuit 10 correspond with the semi-stable time of the first monostable multivibrator 11. And after the memory-setting operation is completed, the semi-stable time of the first monostable multivibrator 11 is stabilized so that the engine output power will be adjusted upon changes of the vehicle speed which is translated into changes of the width of the speed-detecting pulse.

In actual memory-setting of the vehicle speed, either the set-up switch 57 or set-down switch 58 is closed while the vehicle is travelling at a desired rate of travel. This closing of either switch 57 or 58 makes the output of the NAND element 80 "High" (indicated simply by "H" hereinafter) so as to turn the transistor 82 conductive, which energizes the relay 45 to close the open-type contacts 46.

Figure 4:
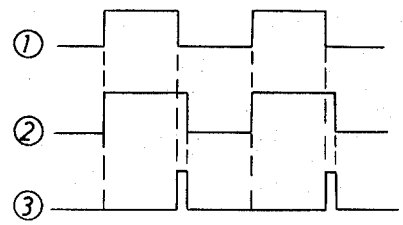
FIGS. 4 and 5 depict operation of the embodiment in accordance with the present invention.

In the case the width of the pulse issued from the flip-flop circuit 10 is shorter than the semi-stable time of the first monostable multivibrator 11, as well shown in FIG. 4, obtained by way of the output of the NAND element 27 are speed-differential-pulses in correspondence with the difference of pulse width between the two types of pulses, one from the flip-flop circuit 10 and the other from the first monostable multivibrator 11. Then the output of the NAND element 27 becomes "Low" (indicated simply by "L" hereinafter) by the differential amount between the widths of the two types of pulses. This a lower potential at the first gate of the MOS. FET 43 through the resistor 28, the diode 47 and the contacts 46. The MOS. FET 43 turns non-conductive and, in turn, turns the transistor 52 conductive. Then, the time-constant of the first monostable multivibrator 11 is shortened so that the semi-stable time thereof becomes shorter so as to correspond with the wave shape of the output from the flip-flop circuit 10.

Figure 5:
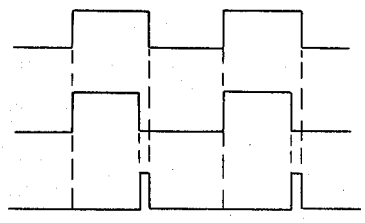

In contrast to the above mentioned process, when the width of the pulse generated from the flip-flop circuit 10 is longer than the semi-stable time of the first monostable multivibrator 11 as well indicated in FIG. 5, the output of the NAND element 12 becomes "L" by the differential amount between the widths of the two types of pulses, one from the flip-flop circuit 10 and the other from the first monostable multivibrator 11. This is fed back to the inverter 14 and the potential is increased at the first gate of the MOS. FET 43 across the resistor 49, the diode 48 and the contacts 46. Then, the MOS. FET 43 turns conductive and the transistor 52 turns non-conductive so that the time-constant of the first monostable multivibrator 11 becomes longer to make the semi-stable time thereof longer than the wave shape of the pulse from the first multivibrator 11 being now overlapped corresponding with that of the output pulse from the flip-flop circuit 10.

It has well been explained that closing of the contacts 46 adjusts the potential at the first gate of the MOS. FET 43 to let the wave shape of the pulse from the flip-flop circuit 10 correspond with that from the first monostable multivibrator 11. Simultaneous opening of either of the set-up or set-down switch 57 or 58 to subsequently open the contacts 46 of the relay 45 stabilizes the potential at the first gate of the MOS. FET 43 by means of the condenser 44. Consequently, the rate of travel of the vehicle at this moment is stored as the semi-stable time of the first monostable multivibrator 11.

In a condition of the travel of the vehicle wherein the set-up and set-down switches 57 and 58 remain open, the output terminal II of the NAND element 55 which forms the flip-flop circuit 54 becomes "H". Simultaneously, the output of the NAND element 80 is conditioned to the "L" state thereof to make the transistor 82 non-conductive and the contacts 46 remain open. The bases of the transistors 24, 40 and 72, which have so far been held non-conductive respectively by the diodes 69, 144 and 71, are changed to "H" so as to turn conductive. At the same time, the output terminal of the NAND element 56 is changed from the "H" to "L" state thereof to trigger the fourth monostable multivibrator 70. So that the output of the fourth multivibrator 70 remains to be at the "L" state thereof for a certain given period of time to consequently turn the transistor 72 non-conductive and open the open-type solenoid valve 78.

When the vehicle speed decreases down to or lower than the pre-set rate of travel under the above described state, the width of the pulse from the flip-flop circuit 10 becomes larger than the semi-stable time of the first monostable multivibrator 11 as shown in FIG. 5. Then, the corresponding speed differential pulses are obtained through the output of the NAND element 12 to trigger the second monostable multivibrator 13. The output of the second multivibrator 13 consequently remains "L" for a given time to make the gate of the NAND element 22 "L" and, in turn, the output terminal of the NAND element 22 becomes "H". This turns the transistor 24 conductive to open the closed-type solenoid valve 25. Engine vacuum is then supplied into the servo-chamber 121 through the intake manifold 133, the conduit 134, the orifice 135, the valve hole 122 and the orifice 124 in sequence. Consequently, the diaphragm 125 is displaced rightward in FIG. 3 so as to open the throttle valve A, which accelerates the prime engine E to increase the vehicle speed.

In case the vehicle speed exceeds the pre-set rate of travel in contrast to the above-mentioned case, as shown in FIG. 4, the width of the pulse from the flip-flop circuit 10 becomes smaller than the semi-stable time of the first monostable multivibrator 11 at the output of the NAND element 27 are the speed differential pulses in correspondence with the difference of the width between the two types of the pulses, one from the flip-flop circuit 10 and the other from the first monostable multivibrator 11. Then, the third monostable multivibrator 29 is triggered to hold the output thereof to be "L" for a given period of time. Consequently, a gate of the NAND element 37 is turned to be "L" and a gate of the NAND element 38 is turned to be "H." Now the output of the NAND element 38 becomes "L" to make the transistor 40 non-conductive and, in turn, the open-type solenoid valve 41 opens. The atmospheric air is, then, led into the servo-chamber 121 through the air-cleaner 136, the valve hole 122 and the orifice 124. This closes the throttle valve A which decelerates the prime engine E to decrease the vehicle speed.

Described below is the operation of the present invention under other conditions, wherein the set-up switch 57 the set-down switch 58 is kept pressed, or closed, the switch 57 or 58 being for fine-adjustment of a predetermined rate of travel of the vehicle.

The set-up switch 57 is kept pressed and the gates of the NAND elements 22, 38 and 80 turn to "L," making the respective output terminals thereof "H." This causes the transistors 24, 40 and 82 to become conductive, the transistors 24, and 40 biasing in turn the closed-type solenoid valve 25 and the open-type solenoid valve 41 of the actuator S shown in FIG. 3 respectively to open and to be closed. Thus, engine vacuum is led into the servo-chamber 121 to open the throttle valve A, which accelerates the engine E for increase of the vehicle speed. Simultaneously, the contacts 46 of the relay 45 close to change the memory.

When the vehicle speed reaches a desired one, the set-up switch 57 is released or opened. Then, the contacts 46 of the relay 45 open, and the vehicle speed at the switch 57 releasing point is memorized to secure the vehicle travel at the constant rate of speed.

The set-down switch 58 is kept pressed or closed, and the gates of the NAND elements 16, 37 and 80 turn to "L," making the relative output potentials thereof "H." This conditions the output of the NAND element 22 to the "L" state thereof and causes the transistor 24 to be non-conductive, the output of the NAND element 38 turning to "L" and the transistor 40 turning non-conductive. Turning off transistors 24 and 40 closes the closed-type solenoid valve 25 of the actuator S and opens the open-type solenoid valve 41. Then, the atmospheric air is delivered into the servo-chamber 121 to close the throttle valve A. Simultaneously, the transistor 82 turns conductive and the contacts 46 of the relay 45 closes, which enables change of the memory.

When the vehicle speed decreases down to a desired one, releasing or opening of the set-down switch 58 stores the desired vehicle speed in the memory to secure the vehicle travel at the desired constant rate of speed.

In the automatic speed control as mentioned above, the output terminal of the fourth monostable multivibrator 70 becomes "H" after a certain given time so as to turn the transistor 72 conductive. The transistor 72 now in a conductive state biases the open-type solenoid valve 78 to close the valve hole 122. Consequently, supply of engine vacuum or the atmospheric air to the servo-chamber 121 can be realized only through the orifice 124. And quick or rough operation of the throttle valve A is prevented so as to control the vehicle speed very smoothly.

During the above mentioned operation, there occurs no sudden operation of the throttle valve A and consequently decreases hunting to a certain extent. However, changes of the vehicle speed to lower than the pre-set one even by a small amount are translated into opening of the throttle valve A and exceeding of the vehicle speed slightly over the predetermined one is translated into closing the throttle valve A. This produces undesired short-term hunting around the predetermined speed, which provides uncomfortable riding to the driver and passengers. A feature of the present invention is, therefore, to prevent such short-term hunting and the novel operation of this feature is explained hereinafter.

The synchronous-pulse generator O is so designed that operation thereof is approximately the same as that of the memory circuit G. Then, as shown in FIG. 4, in case the width of the pulse generated from the flip-flop circuit 10 becomes narrower than that from the fifth monostable multivibrator 84, a pulse representing the width difference appears at the output terminal of the NAND element 86 in a form of "L." The mentioned pulses decrease potential at the gate of the FET. 95 which becomes, in turn, non-conductive, the transistor 98 turning conductive. As a result, the wave shape of the pulse from the fifth monostable multivibrator 84 is shortened so as to corresponding with the wave shape of the pulse from the flip-flop circuit 10. The change of the potential at the gate of the FET. 95 is, however, not made in a sudden way because of the larger capacity of the condenser 94 and the resistance of resitors 90 and 88 compared with those of the condenser 44 and the resistors 28 and 49 within the memory circuit G. In other words, the potential at the gate of the FET. 95 does not decrease immediately upon the changeover of the output of the NAND element 86 to the "L" state. And a certain period of time is spent until the wave shape of the pulse from the fifth monostable multivibrator 84 assumes the same wave shape as that of the pulse from the flip-flop circuit 10.

Meanwhile, in accordance with the changeover of the output of the NAND element 86 to the "L" state, current is supplied to the base terminals of the transistors 101 and 102 across the diode 89 and the resistor 103. Thus, the transistors 101 and 102 in darlington connection became conductive and potential of the condenser 110 increases. Accordingly, in proportion with acceleration the value of "L" as the output generated from the NAND element 86 increases to make conduction time of the transistors 101 and 102 longer, which raises the potential of the condenser 110.

When acceleration stops, the wave shape of the output of the flip-flop circuit 10 becomes the same as that of the pulse from the fifth monostable multivibrator 84 and the output of the NAND element 86 remains in the "H" state thereof. The transistors 101 and 102 turn non-conductive thereby making the potential of the condenser 110 lower as divided by the resistors 111 and 112.

When deceleration takes place, the flip-flop circuit 10 will generate a pulse of which the wave shape is longer than that of the pulse generated from the fifth monostable multivibrator 84, as seen in FIG. 5. The NAND element 85, then, generates pulses corresponding with the difference as its output in the "L" state. This output is inverted by the inverter 87 to provide a higher potential on the gate of the FET. 95. In this case, too, the potential at the gate of the FET. 95 is gradually made higher, the inverter 87 maintains "H" signals intermittently. Base current of the transistors 105 and 106 starts flawing whereby the two transistors 105 and 106 turning conductive to decrease potential on the condenser 110. As the condenser 110 is in connected with the second gate of the MOS.FET. 43, potential on the second gate of the MOS.FET. 43 follows the potenial of condenser 110 as divided by the resistors 111 and 112.

During acceleration, therefore, the MOS.FET. 43 turns conductive to make the effect of transistor 52 negligible. The first monostable multivibrator 11 generates a pulse having a width corresponding to a lower vehicle speed than a pre-set one. The throttle valve A is, consequently, prevented from opening appreciably before the rate of travel of the vehicle reaches a predetermined cruising speed, whereby the vehicle speed will not exceed the predetermined speed.

In deceleration, the MOS.FET. 43 becomes non-conductive and the transistor 52 turns conductive. The first monostable multivibrator 11 generates a pulse having a width corresponding to a higher vehicle speed than the pre-set one. The throttle wave A is, consequently, prevented from closing appreciably before the vehicle speed decreases down to the predetermined speed, whereby the vehicle speed will not decrease below the pre-set cruising one.

As clearly observed from the description hereinabove, in the present invention, acceleration and deceleration can be quickly and accurately detected and ideal fine adjustments as well as ideal regular ones are made for maintaining the selected-cruising speed of the vehicle. Thus, short-term hunting above and below the selected speed is prevented.

In the vehicle speed memory setting operation during acceleration or deceleration with the set-up or set-down switch 57 or 58 closed, conduction of the transistor 82 conditions the gates of the NAND element 85 and 86 to the "L" states thereof and stabilizes the outputs of these elements 85 and 86 at the "H" state thereof. Potential on the second gate of the MOS.FET. 43 is stabilized at a valve corresponding to the potential on condenser 110 divided by the resistors 111 and 112. This prevents displacement between the memorized speed and the speed selected during acceleration or deceleration.

Stepping on the brakes while the vehicle is cruising closes the stop switch 65 which changes-over the input of the inverter 60 to the "H" state from the "L" state. The state of the output of the inverter 60 changes to "L" from "H." Actuation onto the clutch pedal closes the clutch switch 61 to condition the input gate of the NAND element 56 to its "L" state, thereby changing the state of the output terminal of the NAND element 56 to "H" from "L." The state of the output terminal III of the NAND element 55 changes from "H" to "L" and is stabilized at "L" state. Consequently, base potential of the transistors 24, 40 and 72 can only be conditioned to the "L" state to close the closed-type solenoid valve 25 and open the open-type solenoid valves 41 and 78. Fast flow of the atmospheric air rushes into the servo-chamber 121 and the throttle valve A is returned to its idling position.

To resume speed up to the rate before the brake and/or clutch operation, it is required merely to close the resume switch 59. This changes the state of the terminal III of the flip-flop circuit 54 from "L" to "H" and the transistors 24, 40 and 72 become ready to be driven. When the resume switch 59 is closed while the vehicle is travelling at a speed lower than a predetermined speed, the solenoid valve 25 opens and the solenoid valve 41 closes. The solenoid valve 78 is in its open position since the output of the fourth monostable multivibrator 70 stays at the "L" state thereof for a certain period of time. With engine vacuum supplied to the servo-chamber 121, the throttle valve A is quickly opened to resume the selected vehicle speed.

In case the vehicle speed is lowered below the preset one determined by the charge-discharge circuit, comprising the diode 64, the resistor 62 and the condenser 63, the width of the pulse generated by the fifth monostable multivibrator 84 becomes wider to prolong the ON state thereof. The potential of the condenser 63 is be discharged enough to condition the gate of the NAND element 56 forming the flip-flop circuit 54 to the "L" state thereof and the output of the NAND element 55 to the "L" state thereof. Consequently the transistors 24, 40 and 72 cannot be conditioned to the state ready to turn conductive and the same operation takes place as when the brake and/or clutch switch 65 or 61 is closed.

Figure 6:
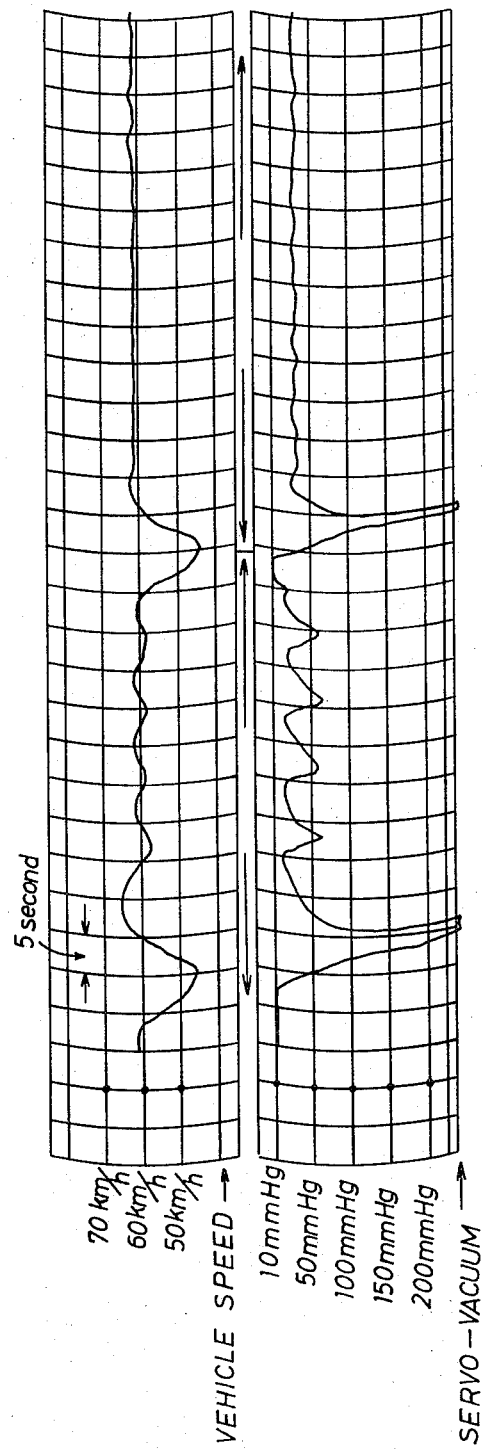
FIG. 6 shows test data of the embodiment in accordance with the present invention.

Indicated in FIG. 6 are test data of the described embodiment of the present invention wherein the upper graph shows changes of the speed of the vehicle and the lower graph depicts vacuum variation for the servo means to control throttle operation. The first half of the data or the left half of FIG. 6 illustrates resume characteristics when the speed memory is set at a speed of 61 km/h with the acceleration-deceleration compensating circuit inoperative. Observed through the figure is overshoot in a speed range from 61 to 65 km/h with acceleration at an approximate speed of 46 km/h. And hunting is also read out approximately at a 10 second cycle every speed increase by 3 to 4 km/h. Under this condition, servo-vacuum may have big changes approximately between 15 to 65 mm Hg to cause sudden and repeated throttle operation. This burns much gasoline unnecessarily.

The second or right half of the data shows resume characteristics of the present embodiment, wherein overshoot and hunting is proved to be very little and the amount of servo-vacuum is also stabilized within a narrow range of change.

In the above-preferred embodiment, the subject matter which is to make fine speed compensation during acceleration/deceleration produced in the course of speed control operation, is applied to the digital speed control system for maintaining the predetermined travel rate of the vehicle by way of comparing the widths between the pulses respectively representing actual speeds of the vehicle and representing a memorized or predetermined rate of vehicle travel. It should, however, fully be noted that the pulses utilized in the comparison process in the above-mentioned embodiment can well be replaced with such regular analogous media as voltage or potential, etc.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed:

1. In a control method for maintaining a predetermined speed of a vehicle by comparing a speed signal generated in response to the sensed speed of the vehicle with a reference signal representative of the predetermined speed of the vehicle, the improvement comprising the steps of:
   a. converting each sensed speed signal into a synchronous pulse during acceleration or deceleration;
   b. comparing each synchronous pulse with each successively generated speed signal after a predetermined time delay;
   c. generating a speed differential pulse in response to each said comparison; and
   d. temporarily adjusting said reference signal in response to each said speed differential pulse;

so as to insure a smooth transition between the initial vehicle speed during acceleration or deceleration and said predetermined vehicle speed.

2. A control method for maintaining a predetermined rate of travel of a vehicle as set forth in claim 1, wherein said adjusting step comprises the steps of adjusting said reference signal to represent a speed below said predetermined speed when the width of said speed signal is small in comparison to the width of said synchronous pulse, and adjusting said reference signal to represent a speed above said predetermined speed when the width of said speed signal is larger in comparison to the width of said synchronous pulse.

3. A speed control system for a vehicle having an engine and a throttle valve for controlling engine rotation in accordance with actuation of an accelerator comprising: a
   a. an actuator for controlling said throttle valve independently of the actuation of said accelerator;
   b. a speed detecting generator for generating a speed signal in response to the speed of the vehicle;
   c. manual control means for selecting a desired speed for the vehicle;
   d. a memory circuit for memorizing a set signal represented by said speed signal at the desired speed of the vehicle in response to the actuation of said manual control means;
   e. a reference signal generator for generating a reference signal corresponding to said set signal memorized in said memory circuit;
   f. a comparison circuit for operating said actuator upon detecting a difference between said speed and said reference signals;
   g. a synchronous pulse generator for generating a synchronous pulse corresponding to said speed signal in response to the instantaneous speed of the vehicle after the desired vehicle speed is defined by said manual control means;
   h. means for comparing said synchronous pulse with the next sequential speed signal generated by speed detecting generator; and
   i. speed acceleration-deceleration compensating circuit means for generating a compensation signal when a difference is detected between said synchronous pulse and said next sequential speed signal, said compensation signal compensating said reference signal temporarily and its represented speed and disabling the compensating operation when said memory circuit is in its operative condition.

4. A speed control system for a vehicle as set forth in claim 3, wherein said memory circuit comprises a field effect transistor of MOS type, of which a first gate, a second gate, a drain and a source are respectively connected to a condenser, to said speed acceleration-deceleration compensating circuit, to an electric source and grounded across a resistor, said field effect transistor being driven by said comparison circuit only when said manual control means is activated.

5. A speed control system for a vehicle as set forth in claim 4, wherein said speed detecting generator comprises a pulse generator for generating a pulse signal in response to a vehicle speed and said speed acceleration-deceleration compensating circuit comprises a pair of NAND elements for selectively generating an output therefrom in response to width differences between said pulses from said pulse generator and said synchronous pulse generator so as to compensate potential on said second gate of said field effect transistor.

6. A speed control system for a vehicle as set forth in claim 5, wherein said speed acceleration-deceleration compensating circuit further comprises an amplifier for amplifying said output from said pair of NAND elements.

7. A speed control system for a vehicle as set forth in claim 4, wherein said speed detecting generator comprises a pulse generator for generating a pulse signal in response to the speed of the vehicle and said reference signal generator comprises a first time-constant circuit including a transistor of which the emitter and collector are respectively connected to a variable resistor and to a condenser, said transistor being driven by said field effect transistor, and a monostable multivibrator being triggered by said pulse signal from said pulse generator and regulated by said first time-constant circuit.

8. A speed control system for a vehicle as set forth in claim 3, wherein said speed detecting generator comprises a pulse generator for generating a pulse signal in response to the speed of the vehicle and said synchronous pulse generator comprises a monostable multivibrator coupled to a time-constant circuit including a transistor, of which the emitter and collector are respectively connected to a variable resistor and to a condenser, said monostable multivibrator being triggered by said pulse generator and said compensating circuit being regulated by comparing the output from said multivibrator and said pulse signal from said pulse generator.

9. A speed control system for a vehicle as set forth in claim 8, wherein said synchronous pulse generator further comprises a field effect transistor of contact type, of which a gate, a drain and a source are respectively connected to a condenser and a pair of resistors respectively across a pair of diodes, to a source of electrical potential and grounded across a resistor, said field effect transistor being driven by comparing said output from said multivibrator and said pulse signal from said pulse generator and controlling conduction of said transistor of said time-constant circuit in accordance with the value of said pair of resistors so as to modify the time constant of said multivibrator.

10. A speed control system for a vehicle as set forth in claim 3, wherein said actuator in a vacuum modulator including a closed-type solenoid valve to control flow of vacuum therein and an open-type solenoid valve to control flow of the atmospheric air therein, said two valves being operated by said comparison circuit.

* * * * *